(12) United States Patent
van Oort et al.

(10) Patent No.: US 10,836,949 B2
(45) Date of Patent: Nov. 17, 2020

(54) MAGNETORHEOLOGICAL FLUIDS AND METHODS OF USING SAME

(71) Applicant: Board of Regents, The University of Texas System, Austin, TX (US)

(72) Inventors: Eric van Oort, Austin, TX (US); Kenneth M Cowan, Austin, TX (US); Sriramya Duddukuri Nair, Austin, TX (US); Raissa Ferron, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1328 days.

(21) Appl. No.: 14/329,436

(22) Filed: Jul. 11, 2014

(65) Prior Publication Data
US 2016/0010424 A1 Jan. 14, 2016

(51) Int. Cl.
| | |
|---|---|
| *C09K 8/46* | (2006.01) |
| *C04B 28/02* | (2006.01) |
| *C09K 8/03* | (2006.01) |
| *C09K 8/516* | (2006.01) |
| *C09K 8/40* | (2006.01) |
| *E21B 33/13* | (2006.01) |
| *C09K 8/467* | (2006.01) |

(52) U.S. Cl.
CPC ............... *C09K 8/46* (2013.01); *C04B 28/02* (2013.01); *C09K 8/032* (2013.01); *C09K 8/40* (2013.01); *C09K 8/467* (2013.01); *C09K 8/516* (2013.01); *E21B 33/13* (2013.01); *C09K 2208/08* (2013.01)

(58) Field of Classification Search
CPC .............. C09K 8/46; C09K 8/40; E21B 33/13
USPC .......................................................... 166/293
See application file for complete search history.

(56) References Cited

U.S. PATENT DOCUMENTS

| | | | |
|---|---|---|---|
| 4,222,444 | A | 9/1980 | Hamilton |
| 4,579,173 | A | 4/1986 | Rosenweig et al. |
| 4,691,774 | A | 9/1987 | Nelson |
| 4,802,534 | A | 2/1989 | Larson et al. |
| 5,645,752 | A | 7/1997 | Weiss et al. |
| 5,670,077 | A | 9/1997 | Carlson et al. |
| 5,839,508 | A | 11/1998 | Tubel et al. |

(Continued)

FOREIGN PATENT DOCUMENTS

| | | | |
|---|---|---|---|
| EP | 0621247 A2 | * | 4/1994 |
| WO | 03042125 | | 5/2003 |

(Continued)

*Primary Examiner* — Zakiya W Bates
*Assistant Examiner* — Ashish K Varma
(74) *Attorney, Agent, or Firm* — Patterson + Sheridan, LLP

(57) ABSTRACT

Described herein are methods of cementing at least a portion of a well comprising feeding a magnetorheological cementitious slurry to a well and applying a magnetic field to the magnetorheological cementitious slurry concurrent with at least a portion of said feeding step to cause a mechanical response in said magnetorheological cementitious slurry in the well. Also disclosed herein are methods of temporarily blocking at least a portion of a well comprising providing a magnetorheological fluid in a well, applying a magnetic field to cause a mechanical response in said magnetorheological fluid thereby blocking at least a portion of the well, and removing the magnetic field to unblock the portion of the well. Also disclosed herein is a magnetorheological cement.

18 Claims, 2 Drawing Sheets

(56) References Cited

U.S. PATENT DOCUMENTS

| | | | |
|---|---|---|---|
| 6,250,848 B1 | 6/2001 | Moridis et al. | |
| 6,257,355 B1 | 7/2001 | Baker | |
| 6,705,085 B1 | 3/2004 | Braithwaite et al. | |
| 6,817,415 B2 * | 11/2004 | Orban | E21B 33/13 166/285 |
| 7,021,406 B2 | 4/2006 | Zitha | |
| 8,631,872 B2 | 1/2014 | East | |
| 2011/0127042 A1 * | 6/2011 | Ocalan | E21B 33/138 166/373 |
| 2011/0297394 A1 * | 12/2011 | VanDelden | E21B 33/06 166/373 |
| 2013/0112911 A1 * | 5/2013 | Mazyar | H01F 1/01 252/62.54 |
| 2015/0315868 A1 | 11/2015 | Fripp et al. | |

FOREIGN PATENT DOCUMENTS

| | | |
|---|---|---|
| WO | 03087529 | 10/2003 |
| WO | 03087531 | 10/2003 |

* cited by examiner

MAGNETORHEOLOGICAL FLUIDS AND METHODS OF USING SAME

FIELD OF THE INVENTION

The present disclosure relates to cementitious and non-cementitious magnetorheological fluids having properties that make them useful in cementing or providing blocks in wells.

BACKGROUND

Well drilling and cementing operations place very rigorous demands upon the fluids involved, and a special area of technology has been developed to supply fluids such as cement slurries capable of meeting such demands.

The displacement efficiency of drilling fluids by spacers and cement slurries during primary cementing operations is enhanced significantly by specific relationship ranges for the rheological properties of each fluid. Typically, lower viscosity fluids are more effectively displaced by higher viscosity fluids. Wellbore irregularities such as changes in wellbore diameters (differing diameters along the length of the wellbore) and shape (oval rather than circular) may require different rheological relationships to maintain effectiveness.

The centralization of the casing in the wellbore is an important variable affecting the displacement efficiency of drilling fluids by spacers and cements. When the casing is not centralized in the wellbore, there is a non-uniform thickness in the gap between the outer diameter of the casing and the wellbore. Fluids flow more easily and faster through the wider gap while fluid flow is typically more difficult and slower in the narrower gap. Therefore, non-uniform displacement of fluids occurs due to non-uniformity of the annular gap.

Incomplete displacement of drilling fluids and/or incomplete cementation can lead to unreliable zonal isolation. Zonal isolation problems were the root cause of the Macondo/Deepwater Horizon event, and are also implicated in leaking cementation in unconventional shale wells.

SUMMARY

Described herein are methods of cementing at least a portion of a well. In some embodiments, the method comprises the steps of feeding a magnetorheological cementitious slurry to a well and applying a magnetic field to the magnetorheological cementitious slurry concurrent with at least a portion of the feeding step to cause a mechanical response in said magnetorheological cementitious slurry in the well. The magnetorheological cementitious slurry can comprise a hydraulic cement and a plurality of magnetic particles. In some embodiments, the magnetic particles can have a mean minimum dimension of 2-200 micrometers ($\mu$m). In some examples, the magnetic particles can comprise magnetic fibers. In some examples, the magnetic fibers have a mean length of 1-20 mm. In some embodiments, the magnetorheological cementitious slurry is substantially free of surfactants and binding agents. The concentration of the magnetic particles in the magnetorheological cementitious slurry can be from 5-80% by weight of cement.

The magnetic field can be generated by any type of magnet, such as, for example, a permanent magnet, an electromagnet, or a combination thereof. In some embodiments, the magnetic field can be generated by an electromagnet. The magnetic field can be, for example, a static magnetic field, a rotating magnetic field, an alternating magnetic field, or a combination thereof. In some embodiments, the magnetic field can have a strength of 0.01-1 Tesla.

In some embodiments, the mechanical response can include an increase in the apparent viscosity of the magnetorheological cementitious slurry, thereby blocking at least a portion of the well. In some embodiments, the mechanical response can include directing the location of the magnetorheological cementitious slurry, thereby blocking at least a portion of the well. In some embodiments, the mechanical response can include an increase in the yield strength of the magnetorheological cementitious slurry. In some embodiments, the mechanical response can include directing the location of the magnetorheological cementitious slurry, thereby displacing at least one of a drilling fluid and a spacer fluid in a well.

In some embodiments, the well can include a casing, a wellbore and an annulus between the casing and the wellbore. In some embodiments, the feeding step can comprise feeding the magnetorheological cementitious slurry into the annulus. In some embodiments, the mechanical response of the magnetorheological cementitious slurry can include directing the magnetorheological cementitious slurry in the annulus to create a seal between the casing and the wellbore.

Also disclosed herein are methods of temporarily blocking at least a portion of a well. The method can comprise providing a magnetorheological fluid in a well, applying a magnetic field to cause a mechanical response in said magnetorheological fluid, thereby blocking at least a portion of the well, and removing the magnetic field to unblock the portion of the well. The magnetorheological fluid can comprise a liquid carrier fluid and a plurality of magnetic particles.

In some embodiments, the mechanical response can include an increase in the viscosity of the magnetorheological fluid. In some embodiments, the mechanical response can include directing the location of the magnetorheological fluid. In some embodiments, the mechanical response can include an increase in the yield strength of the magnetorheological fluid.

In some embodiments, the well includes a casing having a terminus and an opening at an intermediate location. The magnetorheological fluid and magnetic field can be provided such that the magnetorheological fluid can produce a first seal that includes a first portion of the casing including the terminus. In some embodiments, the well further includes a wellbore and an annulus between the casing and the wellbore. The magnetorheological fluid and magnetic field can be provided such that the magnetorheological fluid can produce a second seal in the annulus at a second portion of the casing, thereby providing the first seal and second seal on either side of the opening in the casing.

In some embodiments, the well includes a casing having a terminus, a wellbore, and an annulus between the casing and the wellbore. The magnetorheological fluid and magnetic field can be provided such that the magnetorheological fluid can produce a seal in the annulus around a portion of the casing remote from the terminus to allow the flow of a well fluid through the terminus and into the casing.

In some embodiments, the magnetorheological fluid can be used to form a pressure seal, for example, to prevent a blow-out. In some embodiments, the well can further comprise a blow-out preventer (BOP).

Also disclosed herein is a magnetorheological cement. The magnetorheological cement can comprise a cementitious slurry and a plurality of magnetic particles having a mean minimum dimension of 2-200 µm, wherein the magnetorheological cement is substantially free of surfactants and binding agents.

The details of one or more embodiments are set forth in the description below. Other features, objects, and advantages will be apparent from the description and from the claims and the drawings.

DETAILED DESCRIPTION

Figure 1:
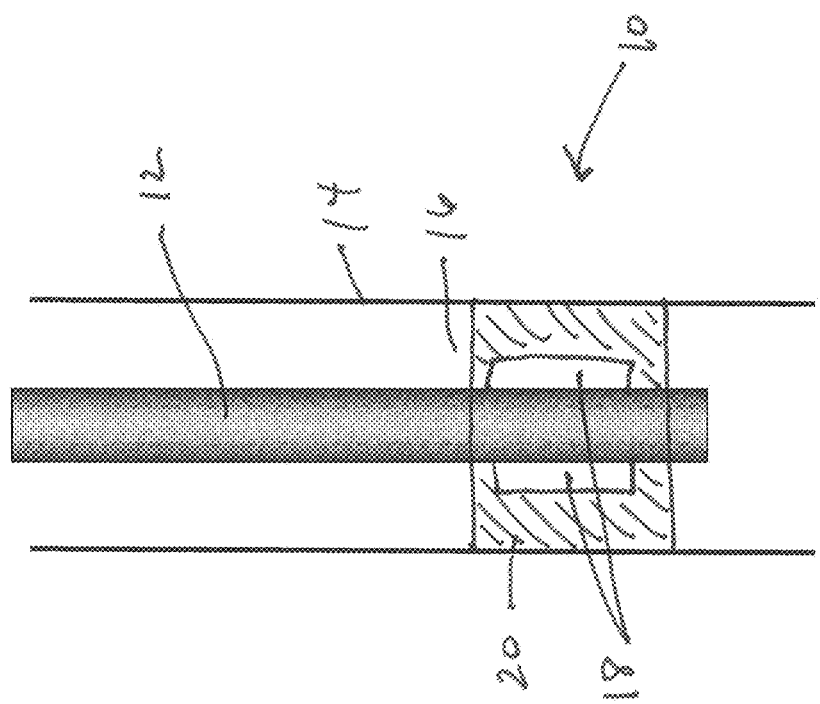
FIG. 1 is a view of a vertical well that has been blocked through the use of a magnetorheological cement.

Described herein are methods of cementing or blocking at least a portion of a well through the use of a magnetorheological fluid. The magnetorheological fluid can comprise a liquid carrier fluid and a plurality of magnetic particles.

The liquid carrier fluid can comprise any fluid useful for blocking at least a portion of a well, such as, for example, a spacer fluid, a drilling fluid, cementitious fluid, or a combination thereof. Drilling fluids include, for example, foams and aerated liquids; water-based fluids that can use clay, a biopolymer, or a combination thereof to viscosify the water-cased fluid; and non-aqueous fluids which can include, but are not limited to, all-oil systems and water-in-oil emulsions. The continuous phase of a non-aqueous oil-based fluid can be, for example, an oil such as diesel oil, a refined mineral oil, or a chemically modified mineral oil. Non-aqueous synthetic-based fluids (e.g. muds) can use synthetic oils such as synthetic paraffins, olefins, esters, acetals, or a combination of these as a base fluid. Reservoir drilling fluids and completion fluids can be brine based fluids that can use salts such as sodium chloride, potassium chloride, calcium chloride, calcium bromide, zinc bromide, sodium formate, potassium formate, cesium formate, or combinations thereof to increase the density and minimize solids in the fluid. Spacer fluids include, for example, pre-flushes that can be used ahead of the cementing fluid and can be used to remove left-over mud from the borehole and water wet surfaces of the casing and wellbore. The spacer fluid can be, for example, a diluted low-density cement slurry; a water-based fluid that can contain a polyacrylamide, a cellulose derivative, a biopolymer (e.g., guar and its derivatives, xanthan gum, scleroglucan, welan, diutan gum, and the like).

In some embodiments, the cementitious fluid can be a magnetorheological cementitious slurry. The magnetorheological cementitious slurry can comprise a hydraulic cement and a plurality of magnetic particles. The hydraulic cement can include any hydraulic cement that is known in the art for use in wells. Suitable hydraulic cements include calcium aluminate cements (e.g., sold as Lumnite or Ciment Fondu), Portland cements, epoxy cements, silicone cements (geothermal cements), and combinations thereof.

The magnetic particles in the magnetorheological fluid can be any suitable magnetic material. In some embodiments, the magnetic particles are essentially chemically inert and stable in the magnetorheological fluid (e.g., the hydraulic cement). Such materials include, for example chromium dioxide; samarium cobalt alloys; iron powders, such as carbonyl iron powder, hematite, magnetite, gamma-$Fe_2O_3$, cobalt-treated iron oxides, and the like; and combinations thereof.

The particle size of the magnetic particle can be any suitable shape and size that provides a stable magnetorheological fluid (i.e., the magnetic particles remain uniformly suspended throughout the magnetorheological fluid under conditions of use in the well and in the presence of a magnetic field). For example, the particle shape can be spheroidal, fibrous (e.g., rod-like), or a combination thereof. In some embodiments, the magnetic particles can have a mean minimum dimension (e.g., diameter of a spheroidal particle or diameter (width) of a rod-like particle) of 2-200 micrometers (µm) (e.g., 5-160 µm, 10-120 µm, 20-80 µm, or 30-70 µm). In some embodiments, the magnetic particles can have a mean minimum dimension of at least 2 µm (e.g., at least 5 µm, at least 10 µm, at least 20 µm, at least 40 µm, at least 60 µm, at least 80 µm, at least 100 µm, at least 120 µm, at least 140 µm, at least 160 µm, or at least 180 µm). In some embodiments, the magnetic particles can have a mean minimum dimension of 200 µm or less (e.g., 180 µm or less, 160 µm or less, 140 µm or less, 120 µm or less, 100 µm or less, 80 µm or less, 60 µm or less, 40 µm or less, 20 µm or less, 10 µm or less, or 5 µm or less). In some embodiments, mixtures of magnetic particles of different sizes can be used. For example, the magnetic particles can have a bimodal distribution with a first mode having a mean minimum dimension of from 2-50 µm and a second mode having a mean minimum dimension of from 100-200 µm. In some embodiments, wherein the magnetorheological fluid is a magnetorheological cementitious slurry, the particle size of the magnetic particles can be selected to be similar to the particle size of the cement particles (e.g., 20 µm). For example, the ratio of the mean particle size of the magnetic particles to the mean particle size of the cement particles can be from 4:1 to 1:4, 3:1 to 1:3, 2:1 to 1:2, 1.5:1 to 1:1.5, or about 1:1.

In some examples, the magnetic particles can be magnetic fibers. The magnetic fibers have a mean length of 1 millimeter (mm) or more (e.g., 2 mm or more, 4 mm or more, 6 mm or more, 8 mm or more, 10 mm or more, 12 mm or more, 14 mm or more, 16 mm or more, or 18 mm or more). In some examples, the magnetic fibers can have a mean length of 20 mm or less (e.g., 18 mm or less, 16 mm or less, 14 mm or less, 12 mm or less, 10 mm or less, 8 mm or less, 6 mm or less, 4 mm or less, or 2 mm or less). In some examples, the magnetic fibers can have a mean length of 1-20 mm (e.g., 1-10 mm, 10-20 mm, 1-5 mm, 5-10 mm, 10-15 mm, 15-20 mm, 2-15 mm, or 2-10 mm) In some examples, mixtures of magnetic fibers of different diameters and or different lengths can be used. In some examples, a mixture of fibers and spheroidal particles can be used.

The amount of magnetic particles included in the magnetorheological fluid can depend on the application. In some embodiments, the concentration of the magnetic particles in the magnetorheological fluid can be from 5-80% by weight of the liquid carrier fluid (e.g., the hydraulic cement). For example, the magnetic particles can be from 10-75% by weight, 15-70% by weight, 20-65% by weight, 25-60% by weight, 30-55% by weight, or 35-50% by weight of the carrier fluid). In some embodiments, the concentration of the magnetic particles in the magnetorheological fluid can be at least 5% by weight of liquid carrier fluid (e.g., at least 15% by weight, at least 30% by weight, at least 45% by weight, at least 60% by weight, or at least 75% by weight of the liquid carrier fluid). In some embodiments, the concentration of the magnetic particles in the magnetorheological fluid can be 80% or less (e.g., 70% by weight or less, 60% by weight or less, 50% by weight or less, 40% by weight or less, 30% by weight or less, 20% by weight or less, or 10% by weight or less of the liquid carrier fluid).

The magnetorheological fluid can include one or more surfactants to stabilize the magnetic particles in the liquid carrier fluid. For example, a non-ionic or anionic surfactant can be used. Suitable surfactants include sulfonated aromatic polymers (e.g., naphthalene sulfonates, sulfonated polystyrenes, sulfonated polyvinyltoluenes, and lignosulfonates); polyamines (e.g., polyalkylenepolyamines), and polyvinylalcohols. In some embodiments, the magnetorheological fluid is substantially free of surfactants.

The magnetorheological fluid can include one or more binding agents. Suitable binding agents include aqueous polymeric dispersions such as styrene-butadiene latexes or thermoplastic or thermosetting resins. In some embodiments, the magnetic particles are coated with a binding agent such as a resin. The binding agent can facilitate the adherence of the magnetic particles when subjected to a magnetic field. In some embodiments, the magnetorheological fluid is substantially free of binding agents.

The magnetorheological fluid can include one or more additional additives. For example, the magnetorheological fluid can include fluid-loss additives, secondary viscosifiers, lubricants, solvents, dispersants, bridging solids, strength improving additives, retarders, accelerators, extenders, lost circulation materials, weighting agents, gases, expansive agents, and combinations thereof. Weighting agents can include, for example, barite, hematite, calcium carbonate, ilmenite, manganese tetra-oxide, titanium dioxide, magnesium oxide, zinc oxide, alumina or other aluminum oxides, galena (lead sulfide), and combinations thereof.

In some embodiments, the magnetorheological fluid has an apparent viscosity of less than 200 centipoise (cP) at 25° C. in the absence of a magnetic field (e.g., less than 190 cP, less than 180 cP, less than 170 cP, less than 160 cP, less than 150 cP, less than 140 cP, less than 130 cP, less than 120 cP, less than 110 cP, less than 100 cP, less than 90 cP, less than 80 cP, less than 70 cP, less than 60 cP, less than 50 cP, less than 40 cP, less than 30 cP, less than 20 cP, or less than 10 cP).

The magnetorheological fluid can be prepared by any method known in the art. In the case of magnetorheological cementitious slurries, the magnetic particles can be blended with the dry hydraulic cement and the dry blend can then be added to a liquid medium with stirring or other mechanical means of agitation. In some embodiments, the magnetorheological fluid can be prepared at the well site using conventional blending equipment to blend the solids and liquids together.

The magnetorheological cementitious slurry can be fed to a well for use therein. As shown in FIG. 1, a well 10 can include a casing 12, a wellbore 14 and an annulus 16 between the casing and the wellbore. In some embodiments, the magnetorheological cementitious slurry can be fed into the annulus 16. For example, the magnetorheological cementitious slurry can be pumped through the casing 12 to the bottom of the wellbore 14 and then upwardly through the annulus 16 until the desired zone has been filled with magnetorheological cementitious slurry.

Magnet (or magnets) 18 can be used to create a magnetic field that can be used to cause a mechanical response in the magnetorheological cementitious slurry. The magnet 18 can be any type of magnet, such as, for example, a permanent magnet, an electromagnet, or a combination thereof. The magnetic field can be, for example, a static magnetic field, a rotating magnetic field, an alternating magnetic field, or a combination thereof. The magnetic field can be applied radially or axially with respect to the casing 12. Although the magnet 18 is illustrated as being outside of the casing 12 in the figures provided herewith, it can also be located inside of the casing 12. Alternatively, the casing 12 can be magnetized.

In some embodiments, the magnetic field can be generated by an electromagnet. The electromagnetic field can be produced by a downhole generator such as a turbine or through the use of tool that is powered from a surface energy source. The well fluid can be used to power equipment such as the tool or the downhole turbine being used to produce the electromagnetic field. For example, the tool or downhole turbine can be powered by flow (injection or production) of fluids including produced oil and gas, gas injection (i.e., gas lift, gas disposal, $CO_2$ injection), or enhanced recovery processes such as water flooding, solvent flooding, $CO_2$ flooding, or a combination thereof.

The magnetic field can be of any strength or form sufficient to achieve the desired mechanical response in the magnetorheological fluid. In some embodiments, the magnetic field can have a strength of 0.01-1 Tesla (e.g., 0.1-0.9 Tesla, 0.2-0.8 Tesla, 0.3-0.7 Tesla, or 0.4-0.6 Tesla). In some embodiments, the magnetic field can have a strength of at least 0.01 Tesla (e.g., at least 0.1 Tesla, at least 0.2 Tesla, at least 0.3 Tesla, at least 0.4 Tesla, at least 0.5 Tesla, at least 0.6 Tesla, at least 0.7 Tesla, at least 0.8 Tesla, or at least 0.9 Tesla). In some embodiments, the magnetic field can have a strength of 1 Tesla or less (e.g., 0.9 Tesla or less, 0.8 Tesla or less, 0.7 Tesla or less, 0.6 Tesla or less, 0.5 Tesla or less, 0.4 Tesla or less, 0.3 Tesla or less, 0.2 Tesla or less, or 0.1 Tesla or less). The strength of the magnetic field used can depend in part on the concentration of magnetic particles in the magnetorheological fluid (e.g., lower concentrations of magnetic particles can call for higher magnetic field strengths, and vice-versa).

In some embodiments, as shown in FIG. 1, the magnetic field can be used to direct the magnetorheological cementitious slurry in the annulus 16 into a zone 20 to create a seal between the casing 12 and the wellbore 14 to cement the well. In some embodiments, the magnetorheological cementitious slurry can displace at least one of a drilling fluid and a spacer fluid in a well 10. In some embodiments, the magnetic field can be applied to the magnetorheological cementitious slurry concurrent with at least a portion of the step of feeding the magnetorheological cementitious slurry into the well 10, e.g., into the annulus 16. The magnetic field can also be used to create any other mechanical response useful in cementing at least a portion of a well 10. In some embodiments, the mechanical response can include an increase in the apparent viscosity or the yield strength of the magnetorheological cementitious slurry such as when the slurry is in the annulus 16, thereby blocking at least a portion of the well 10 such as in zone 20. For example, the apparent viscosity of the magnetorheological fluid can be increased by 50%, 100%, 150%, 200%, 300%, 400%, 500%, 1000% or more when subjected to a magnetic field. The yield stress of the magnetorheological fluid can be increased by 25%, 50%, 100%, 150%, 200%, 250%, 300%, 500% or more when subjected to a magnetic field.

The centralization of the casing 12 in the wellbore 14 is an important variable affecting displacement efficiency of drilling fluids and/or cementing of the casing. When the casing 12 is not centralized in the wellbore 14, i.e., when there is a non-uniform thickness in the annulus 16 between the outer diameter of the casing 12 and the wellbore 14, fluids flow more easily and faster through the wider gap in the annulus, while fluid flow is typically more difficult and slower in the narrower gap in the annulus. In some embodiments, the magnetic field can be used to cause a mechanical response in the magnetorheological cementitious slurry when the casing 12 is not centralized in the wellbore 14. In some embodiments, a magnetic field can be applied by magnets 18 to direct the magnetorheological cementitious slurry in the annulus 16 to create a more uniform seal between the casing 12 and the wellbore 14. In some embodiments, the magnetic field can direct the magnetorheological cementitious slurry away from the wider gap and/or towards the narrower gap in the annulus 16. In some embodiments, a differential magnetic field strength can be used direct the magnetorheological cementitious slurry away from the wider gap and/or towards the narrower side (gap) in the annulus 16. For example, a lower strength magnetic field can be applied to the wider side (gap) while a higher strength magnetic field is applied to the narrower side (gap) to direct the magnetorheological cementitious slurry more uniformly about the entire annulus 16. In some embodiments, a rotating magnetic field can be used to create a radial circulation of the magnetorheological cementitious slurry around the entire circumference of the casing 12.

Figure 4:
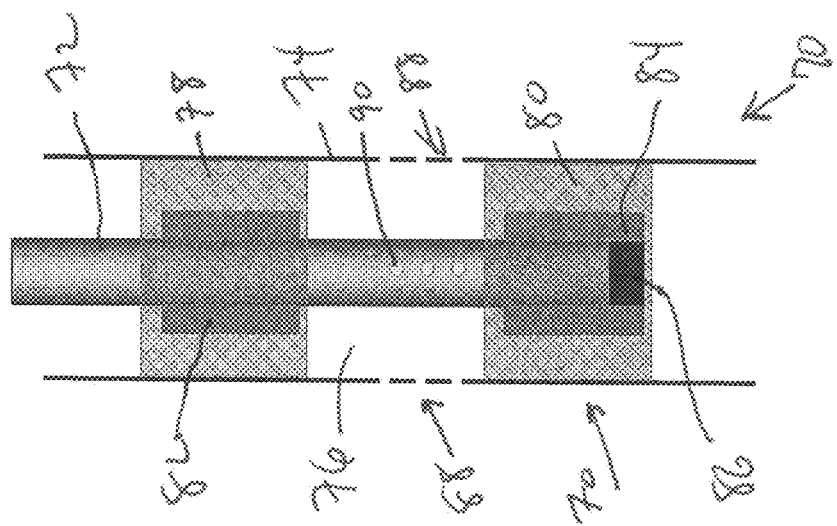
FIG. 4 is a view of an embodiment wherein a temporary block is formed using a magnetorheological cement in a bottom portion and a top portion of a vertical well.
Figure 3:
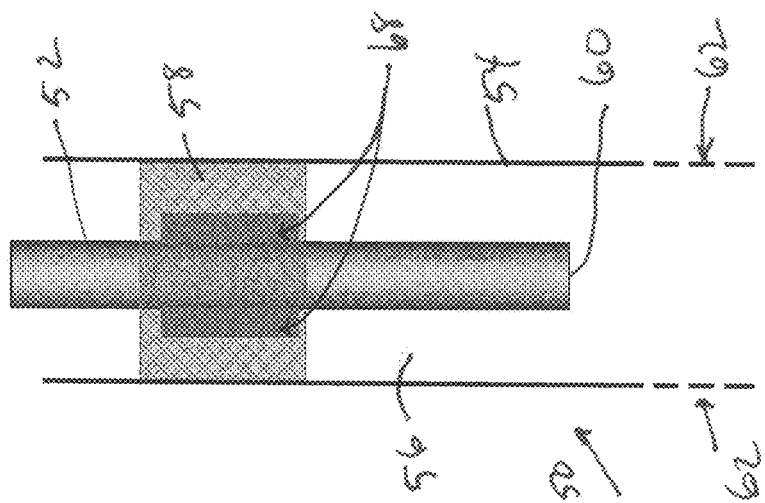
FIG. 3 is a view of an embodiment wherein a temporary block is formed using a magnetorheological cement in a top portion of a vertical well.
Figure 2:
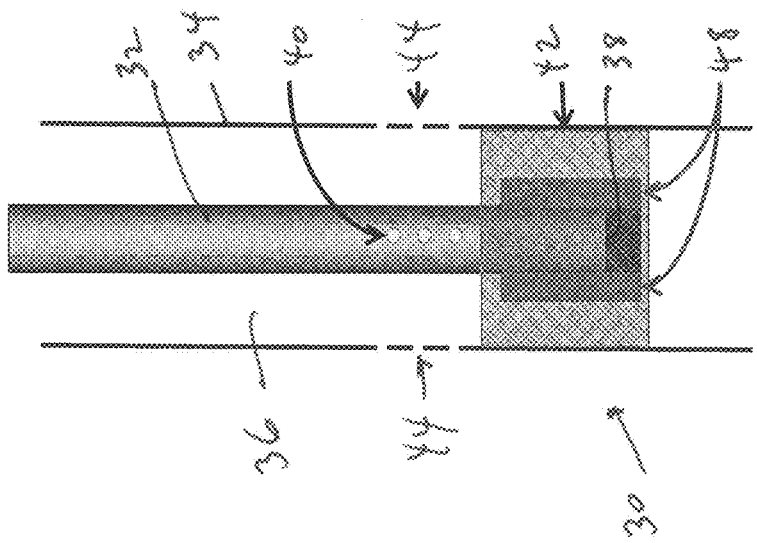
FIG. 2 is a view of an embodiment wherein a temporary block is formed using a magnetorheological cement in a bottom portion of a vertical well.

In some embodiments, as shown in FIGS. 2-4, a magnetic field can be applied to a magnetorheological fluid to block at least a portion of a well. For example, a magnetorheological fluid can be provided in a well, a magnetic field can be applied to cause a mechanical response in the magnetorheological fluid thereby temporarily (or even permanently) blocking at least a portion of the well, and the magnetic field can be removed to unblock the blocked portion of the well. Blocking of the well can be used for well treatment operations, which can include completion, re-completion, stimulation, remedial cementing, casing repair, sidetracking the wellbore, tool recovery, well control, gravel pack repair, blow-out prevention, or water shut-off/profile control. For example, blocking can be used where conventional wireline or tubular-conveyed bridge plugs or packers would have to be drilled out or are at high risk of being damaged during installation or retrieval wherein their removal would render the wellbore unusable for future use or production. The magnetorheological fluid can also be used to form a pressure and flow prevention seal in the annulus to compensate for incomplete displacement of a drilling fluid and/or a spacer fluid by cement during a primary cementing operation. Incomplete displacement can result in an incomplete circumferential fill of cement around the pipe and along axial sections of a casing, which undesirably provides a channel for pressure communication and flow along the length of the wellbore. In some embodiments, the magnetorheological fluid can be used to form a pressure and flow prevention seal in the annulus above the top of cement to prevent a build-up of sustained casing pressure that may damage shallow casings or prevent the flow of fluids to shallow permeable formations or to the surface. In some embodiments, the magnetorheological fluid can be used as a block for well control, isolation of sections of a wellbore during remedial or recompletion treatments, abandonment operations, or blow-out prevention.

The mechanical response of the magnetorheological fluid can involve any mechanical response useful in at least temporarily blocking at least a portion of a well. In some embodiments, the mechanical response can include an increase in the viscosity of the magnetorheological fluid. In some embodiments, the mechanical response can include directing the location of the magnetorheological fluid. In some embodiments, the mechanical response can include an increase in the yield strength of the magnetorheological fluid.

In some embodiments, as shown in FIG. 2, a well 30 can include a casing 32 in a wellbore 34 and an annulus 36 between the casing and the wellbore. The casing 32 can have a terminus 38 and an opening 40 (or openings) at an intermediate location in the casing. The magnetorheological fluid can be provided in a zone 42 such as by directing the fluid to the zone either through the use of a magnetic field or otherwise. A magnetic field provided by a magnet 48 can be applied in zone 42 to increase the yield stress or viscosity of the magnetorheological fluid such that the magnetorheological fluid produces a seal in the zone 42 that includes a first portion of the casing 32 including the terminus 38. The temporary block formed in the zone 42 can be used to block off the flow of well fluids through the terminus 38 and can also block off more remote portions of the well 30 (i.e., the bottom portion in a vertical well). A well fluid, such as oil, water, natural gas, carbon dioxide, or a mixture thereof, can then flow from the wellbore 34 through perforations (openings) 44 into the opening 40 and up through the casing 32 to be collected.

In some embodiments, as shown in FIG. 3, a well 50 further includes a casing 52 in a wellbore 54 and an annulus 56 between the casing and the wellbore. The magnetorheological fluid can be provided in a zone 58 such as by directing the fluid to the zone either through the use of a magnetic field or otherwise. A magnetic field can be produced from magnet 68 and applied to increase the yield stress or viscosity of the magnetorheological fluid such that the magnetorheological fluid produces a seal in the zone 58 of the annulus 56 around a portion of the casing 52 remote from a terminus 60 in the casing 52. In this embodiment, the top portion of the well 50 is blocked to allow the flow of a well fluid through the terminus 60 and into the casing 52.

FIG. 4 illustrates a combination of the embodiments described in FIGS. 2 and 3. In FIG. 4, the well 70 includes a casing 72, a wellbore 74, and an annulus 76 between the casing and the wellbore. The magnetorheological fluid can be directed to a first zone 78 and a second zone 80 as described above. A magnetic field can be applied in the first zone 78 through the use of first magnet 82 to produce a first seal in the annulus, and a magnetic field can be applied in the second zone 80 through the use of a second magnet 84 to produce a second seal in the annulus 76 including a terminus 86 of the casing 72. The first seal and second seal block of the top and bottom portions of the well 70 to allow a well fluid to flow through perforations 88 into an opening 90 in the casing 72 and up through the casing 72 to be collected.

In each of the embodiments provided in FIGS. 2-4, the temporary block can be removed by removing the magnetic field being applied to the magnetorheological fluid. The temporary block can be maintained by the magnetic field for a period that is sufficient for the purpose of blocking the annulus, e.g., several hours to several days.

Although FIGS. 1-4 are illustrated as vertical wells, the embodiments described herein can also be used in horizontal, deviated or extended reach wells.

In some embodiments, the magnetorheological fluid can be used to form a pressure seal to prevent a blow-out. A blow-out is the uncontrolled flow of a formation fluid, such as the produced oil or gas, from a well. Well blow-outs can occur, for example, during drilling, testing, completion, production, or workover activities. A blow-out can occur at the surface (e.g., a gusher), subsea or underground (e.g., formation fluids from a high pressure zone flow uncontrolled to a lower pressure zone within the well).

In some embodiments, the magnetorheological fluid can be provided in a well. A magnetic field can be applied to increase the yield strength or viscosity of the magnetorheological fluid such that the magnetorheological fluid produces a pressure seal in the well to prevent a blow-out.

In some embodiments, the well further comprises a traditional blow-out preventer (BOP). A blow-out preventer (BOP) can be a large, specialized valve or similar mechanical device used to seal, control and monitor wells. Blow-out preventers cope with the extreme erratic pressures and uncontrolled flow (e.g., blow-out) that can emanate from a well. In addition to controlling the downhole pressure and flow of formation fluids, blow-our preventers can prevent tubing (e.g., drill pipe, well casing, etc.), tools, and/or drilling fluid from being blown out of the wellbore. In some embodiments, the pressure seal produced by the magnetorheological fluid can improve or supplement the blow-out preventer to prevent a blow-out.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than in the examples, or where otherwise noted, all numbers expressing quantities of ingredients, reaction conditions, and so forth used in the specification and claims are to be understood at the very least, and not as an attempt to limit the application of the doctrine of equivalents to the scope of the claims, to be construed in light of the number of significant digits and ordinary rounding approaches.

What is claimed is:

1. A method of cementing at least a portion of a well, comprising the steps of:
    feeding a magnetorheological cementitious slurry to a well including a casing, a wellbore, and an annulus between the casing and the wellbore, wherein said magnetorheological cementitious slurry comprises a hydraulic cement and a plurality of magnetic particles, and wherein the concentration of the magnetic particles in the magnetorheological cementitious slurry is from 30 to 80 percent by weight of cement;
    moving the magnetorheological cementitious slurry through the annulus; and
    controlling, using an electromagnet disposed in the casing, a magnetic field strength applied to the magnetorheological cementitious slurry moving through the annulus, wherein the applied magnetic field strength is selected from at least two different non-zero magnetic field strength values to selectively alter at least one of a viscosity and a yield strength of the magnetorheological cementitious slurry, wherein the magnetic field strength is from 0.01 to 1 Tesla.

2. The method of claim 1, wherein controlling the magnetic field strength comprises increasing the magnetic field strength to increase the viscosity of the magnetorheological cementitious slurry thereby resulting in blocking at least a portion of the annulus.

3. The method of claim 1, wherein controlling the magnetic field strength comprises increasing the magnetic field strength to direct the magnetorheological cementitious slurry to a location within the annulus to thereby block at least a portion of the annulus.

4. The method of claim 1, wherein controlling the magnetic field strength comprises increasing the magnetic field strength to increase the yield strength of the magnetorheological cementitious slurry.

5. The method of claim 1, wherein controlling the magnetic field strength comprises increasing the magnetic field strength to direct the magnetorheological cementitious slurry to a location within the annulus to thereby displace at least one of a drilling fluid and a spacer fluid in the annulus.

6. The method of claim 1, wherein the magnetic particles have a mean minimum dimension of from 2 μm to 200 μm.

7. The method of claim 1, wherein the magnetic particles comprise magnetic fibers.

8. The method of claim 7, wherein the magnetic fibers have a mean length of from 1 mm to 20 mm.

9. The method of claim 1, wherein the concentration of the magnetic particles in the magnetorheological cementitious slurry is from 30 percent to 55 percent by weight of cement.

10. The method of claim 1, wherein the magnetic field is a static magnetic field, a rotating magnetic field, an alternating magnetic field, or a combination thereof.

11. The method of claim 1, wherein the magnetorheological cementitious slurry is free of surfactants and binding agents.

12. The method of claim 1, wherein controlling the magnetic field strength includes:
    applying a first magnetic field strength to a first portion of the magnetorheological cementitious slurry moving through the annulus to induce a first viscosity therein; and
    applying a second magnetic field strength less than the first magnetic field strength to a second portion of the magnetorheological cementitious slurry moving through the annulus to induce a second viscosity therein, wherein the second viscosity is less than the first viscosity.

13. The method of claim 12, wherein the first viscosity is greater than or equal to a third viscosity sufficient to block at least a portion of the annulus, wherein the second viscosity is less than the third viscosity, and wherein the second viscosity is greater than or equal to a fourth viscosity sufficient to displace at least one of a drilling fluid and a spacer fluid.

14. The method of claim 1, wherein a first radial portion of the annulus has a first width and a second radial portion of the annulus has a second width different from the first width, wherein controlling the magnetic field strength comprises applying a first magnetic field strength to the first radial portion and applying a second magnetic field strength greater than the first magnetic field strength to the second radial portion.

15. The method of claim 14, wherein controlling the magnetic field strength selectively directs a flow of the magnetorheological cementitious slurry away from the first radial portion and toward the second radial portion.

16. The method of claim 15, wherein the first width is greater than the second width.

17. The method of claim 1, wherein controlling the magnetic field strength comprises applying a rotating magnetic field to the magnetorheological cementitious slurry moving through the annulus to induce a radial circulation of the magnetorheological cementitious slurry.

18. The method of claim 1, wherein each of the non-zero magnetic field strength values is generated by a static magnetic field.

* * * * *